United States Patent
Speed et al.

(10) Patent No.: US 7,017,299 B1
(45) Date of Patent: Mar. 28, 2006

(54) GARDENING CAGE APPARATUS AND SYSTEM

(76) Inventors: Janet R. Speed, 1353 Orleans Ct., Grayson, GA (US) 30017; Stacey E. Talbot, 1931 North Oak Dr., Lawrenceville, GA (US) 30044

( * ) Notice: Subject to any disclaimer, the term of this patent is extended or adjusted under 35 U.S.C. 154(b) by 0 days.

(21) Appl. No.: 10/842,621

(22) Filed: May 10, 2004

(51) Int. Cl.
*A01G 17/06* (2006.01)
*A01G 25/00* (2006.01)

(52) U.S. Cl. ............... 47/44; 47/45; 47/47; 47/79; 47/82; 47/21.1

(58) Field of Classification Search ............ D25/15, D25/100, 101; 47/21.1, 31, 20.1, 79, 29.2, 47/82, 32.4, 32.5, 42–45, 47, 48.5
See application file for complete search history.

(56) References Cited

U.S. PATENT DOCUMENTS

| 199,353 | A | * | 1/1878 | Clark | 47/45 |
|---|---|---|---|---|---|
| 905,647 | A | * | 12/1908 | Case | 47/44 |
| 963,030 | A | | 7/1910 | Balch | |
| 1,361,464 | A | * | 12/1920 | Hunt | 47/47 |
| 2,009,867 | A | * | 7/1935 | Ball | 47/44 |
| 2,982,586 | A | * | 5/1961 | Gliebe | 403/109.3 |
| 3,426,544 | A | | 2/1969 | Curtis | |
| 3,579,908 | A | * | 5/1971 | Morgan | 47/45 |
| 3,672,571 | A | | 6/1972 | Goodricke | |
| 3,803,759 | A | * | 4/1974 | Heinecke | 47/47 |
| 3,865,309 | A | | 2/1975 | Greenhalgh | |
| 4,285,163 | A | * | 8/1981 | Booker, Jr. | 47/45 |
| 4,603,506 | A | * | 8/1986 | Powell, Jr. | 47/62 E |
| 4,782,792 | A | * | 11/1988 | Anthony et al. | 119/665 |
| 4,785,576 | A | * | 11/1988 | Morgan | 47/29.1 |
| 4,922,653 | A | | 5/1990 | Stone | |
| 5,031,266 | A | * | 7/1991 | Tillman et al. | 15/327.2 |
| 5,326,337 | A | * | 7/1994 | Pardella | 482/36 |
| 5,357,710 | A | | 10/1994 | Dulik et al. | |
| 5,480,336 | A | * | 1/1996 | Blanchard | 446/89 |
| 5,605,010 | A | | 2/1997 | Furlong et al. | |
| 5,862,625 | A | * | 1/1999 | Parker | 47/47 |
| 5,881,495 | A | * | 3/1999 | Clark | 47/48.5 |
| 5,913,477 | A | | 6/1999 | Dean | |
| 5,913,635 | A | | 6/1999 | Graham | |
| 6,413,004 | B1 | * | 7/2002 | Lin | 403/176 |
| 6,540,156 | B1 | * | 4/2003 | Martin | 239/310 |

FOREIGN PATENT DOCUMENTS

GB 2237964 A * 5/1991

* cited by examiner

*Primary Examiner*—Peter M. Poon
*Assistant Examiner*—Andrea M. Valenti
(74) *Attorney, Agent, or Firm*—Greg O'Bradovich, Esq.; Myers & Kaplan, LLC

(57) ABSTRACT

A gardening cage having self-irrigating and self-fertilizing devices. In a typical embodiment, the cage includes panels having a frame that includes a plurality of horizontal and vertical rungs. The panels are connected so that rungs of respective panels cascade with respect to rungs of the adjacent panel. In a typical embodiment, the bottom rungs of each panel include irrigating holes so that water injected into the rungs can be dispensed around the periphery of the vines. The water is typically suppled to the cage by a hose that connects to a water inlet that feeds the holes. Several cages can be placed side by side and can be fitted with "T" fittings that branch off the supply hose and feed the individual cages via the water inlet fitting.

16 Claims, 7 Drawing Sheets

Fig_5

Fig. 7

GARDENING CAGE APPARATUS AND SYSTEM

BACKGROUND

I. Field of the Invention

The present invention relates generally to the field of produce gardening and more particularly to a gardening cage apparatus and system.

II. Description of the Related Art.

Gardening cages are used for a variety of crops such as pole beans, cucumbers or any blooming vine growers, including smaller plants such as peppers, bush beans and the like. A very popular use of cages is for tomato plants. Most tomato cages provide inadequate support for plants with heavy fruit. Present cages typically require significant tying and staking of vines to the cage. Tying and staking is not only time-consuming but can cut the vines thereby causing disease and insect infestation. Present irrigation techniques often result in the use of too much water since irrigation is not gradual. Therefore, water tends to puddle and run-off. In addition, present irrigation techniques can wet leaves and vines causing rot and detrimental growth such as mold and fungus. In addition, water on the leaves can cause tomato bacterial wilt, a major killer of tomato vines and tobacco masaic virus (TMV). These cages also tend to be flimsy and topple over or fall apart as they tomato vines grow.

SUMMARY

In general, the invention features a gardening cage having self-irrigating and self-fertilizing devices for use with a 11 types of blooming vine growing plants, particularly tomatoes. In a typical embodiment, the cage includes three panels having a frame that includes a plurality of horizontal and vertical rungs. The panels are connected so that rungs of respective panels cascade with respect to rungs of the adjacent panel. The cascading orientation provides structural advantages as well as the ability to be broken down and folded on itself for ease of storage and transport. Although several geometric arrangements are contemplated, a triangular arrangement of the panels is typical. The cage allows tomato vines to be trained as they grow within the cage, thereby providing good support. The self-irrigating features allow the vines to be watered inexpensively and with ease. In a typical embodiment, the bottom rungs of each panel include irrigating holes so that water injected into the rungs can flow out of the holes, nozzles or drippers along the base of the cage, thereby dispensing water around the periphery of the vines. The water is typically suppled to the cage by a hose that connects to a water inlet that feeds the holes. The cage is typically set around the tomato plant with the ground engaging the legs being placed in the ground for sturdy support. Several cages can be placed side by side and can be fitted with "T" fittings that branch off the supply hose and feed the individual cages via the water inlet fitting.

In general, in one aspect, the invention gardening cage apparatus, including a plurality of geometrically arranged panels connected by common corners and being in a cascaded arrangement, each of the panels having a plurality of horizontally and vertically arranged hollow rungs, a plurality of T-connectors connecting adjacent horizontal rungs, a second plurality of T-connectors connecting vertical rungs, wherein both plurality of connectors further connect vertical rungs and horizontal rungs to one another, thereby coupling the hollow interiors of all rungs creating an internal interconnected matrix, stakes connected to bottom horizontal rungs of each of the panels, a water inlet connected to one rung of one of the panels, the water inlet being coupled to the internal matrix and a plurality of irrigation orifices located on the bottom horizontal rungs, the orifices being coupled to the matrix.

In one implementation, the apparatus further includes an fertilization coupling connected to a rung adjacent the water inlet.

In another implementation, the rungs include deformable flanges.

In another implementation, the apparatus includes a button connected to one of the flanges.

In another implementation, the apparatus further includes one or more button holes located on the plurality of connectors.

In another implementation, the buttons align with the button holes when the rungs are inserted into the connectors, thereby creating a secure fit.

In still another implementation, the apparatus includes an elbow on each panel connecting a horizontal rung of one panel to a vertical rung of an adjacent panel.

In yet another implementation, the apparatus includes tips located on one end of the stakes.

In another implementation, the tips are oriented in a common plane.

In another aspect, the invention features a gardening cage kit, including a gardening cage having a plurality of geometrically arranged panels connected by common corners and being in a cascaded arrangement, each of the panels having a plurality of horizontally and vertically arranged hollow rungs, a plurality of T-connectors connecting adjacent horizontal rungs, a second plurality of T-connectors connecting vertical rungs, wherein both plurality of connectors further connect vertical rungs and horizontal rungs to one another, thereby coupling the hollow interiors of all rungs creating an internal interconnected matrix, stakes connected to bottom horizontal rungs of each of the panels, a water inlet connected to one rung of one of the panels, the water inlet being coupled to the internal matrix and a plurality of irrigation orifices located on the bottom horizontal rungs, the orifices being coupled to the matrix, wherein the panels are adapted to be connected and disconnected from each other.

In one implementation, the kit further includes a hose adapted to be connected to the water inlet.

In another implementation, the kit further includes a fertilizer coupling adapted to be connected to a rung of the cage.

In another implementation, the kit further includes a protective sheath adapted to fit over the cage.

In another implementation, the sheath is plastic.

In another implementation, the sheath is netting.

One advantage of the invention is that the cage provide support from being blown over in the wind.

Another advantage is that tomato vines can grow through the rungs without becoming overgrown upon itself.

Another advantage is that tying and staking is eliminated.

Another advantage of the invention is that the self-irrigating features allows uniform irrigation to the roots, but keeps water away from the leaves and stems thereby preventing rot and detrimental growth such as mold and fungus.

Another advantage is that the self-irrigating system allows gradual watering thereby allowing good absorption into the soil and roots and prevents puddling and water run-off.

Another advantage of the invention is that the cage can be folded and stored.

Another advantage of the invention is that several cages can be interconnected and provided with a single water source for self-irrigation of all cages.

Another advantage of the invention is that the triangular panel orientation forces vines to buttress and reinforce each other rather than expanding outward, thereby increasing self-support.

Another advantage of the invention is that due to increased structure and growth control more than one plant can be grown in an individual cage.

Another advantage of the invention is that the cage can be used on both even and uneven ground and even on patios and decks.

Other objects, advantages and capabilities of the invention will become apparent from the following description taken in conjunction with the accompanying drawings showing the preferred embodiment of the invention.

DETAILED DESCRIPTION

Figure 1:
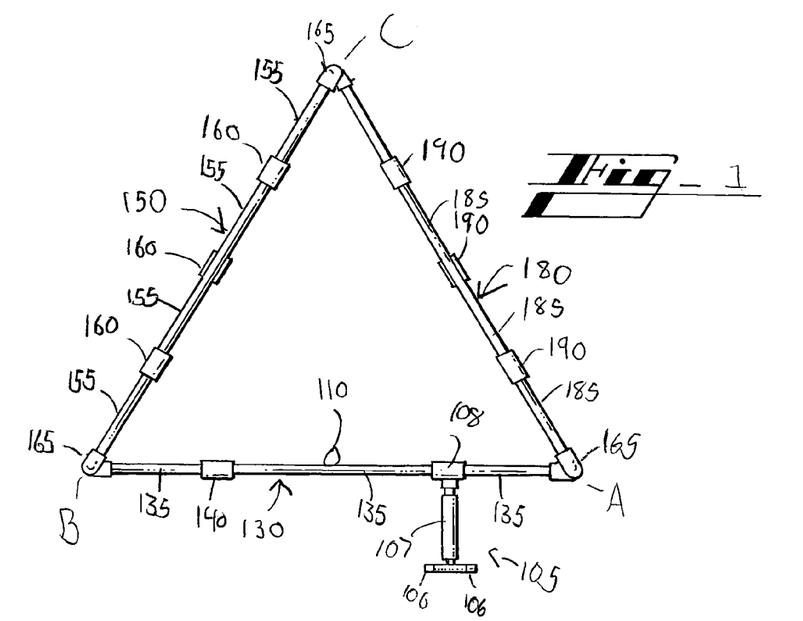
FIG. 1 illustrates a top view of an embodiment of a gardening cage.

Referring to the drawings wherein like reference numerals designate corresponding parts throughout the several figures, reference is made first to FIG. 1 that illustrates a top view of an embodiment of a gardening cage 100. The cage 100 typically includes several panels arranged geometrically. In a typical embodiment, three panels 130, 150, 180 are arranged in a triangular orientation, generally defining three corners A, B, C of the cage 100. The triangular orientation of the panels 130, 150, 180 offers several advantages. One such advantage is that vine growing plants such as tomatoes, which normally tend to grow outward, now grows inward on itself, which encourages vines to buttress and reinforce each other. In addition, by growing inwards, the vines tend to grow through the panels and on through the rungs (see below), thereby obviating the need for staking and tying. The panels 130, 150, 180 include a plurality of horizontal rungs 135, 155, 185 and connectors 140, 160, 190 that connect the horizontal rungs 135, 155, 185 to one another. The panels 130, 150, 180 further include elbows 165 that interconnect the horizontal rungs 135, 155, 185 with vertical rungs (see below).

The cage 100 further includes a water inlet 105 that can include one or more barbed fittings 106 to receive a water source such as a hose and to connect to inlets on adjacent cages, if connected. The inlet 105 can include an extension 107, if necessary, and a coupling 108 to the cage 100. The cage 100 can further include a fertilizer coupling 110. The fertilizer coupling 110 allows fertilizer to be added directly into the cage 100.

In a typical embodiment, the horizontal rungs 135, 155, 185 and vertical rungs (as discussed further in the description below, are hollow tubular bodies. The connectors 140, 160, 190 and elbows 165 are also typically hollow and tubular. Therefore, all rungs of all panels 130, 150, 180 are coupled together creating a continuous water channel matrix throughout the cage. It is appreciated that when fertilizer is added to the fertilizer coupling 110, the fertilizer can mix with the water injected into the cage 100 and mix within the entire matrix formed by the panels 130, 150, 180. Therefore, any water injected into the inlet 105 fills the entire inner hollow space of the cage 100, provided that the cage 100 has no exit for the water. It is appreciated in the descriptions below, particularly with respect to FIG. 2, that the cage 100 does have an exit for the water.

Figure 2:
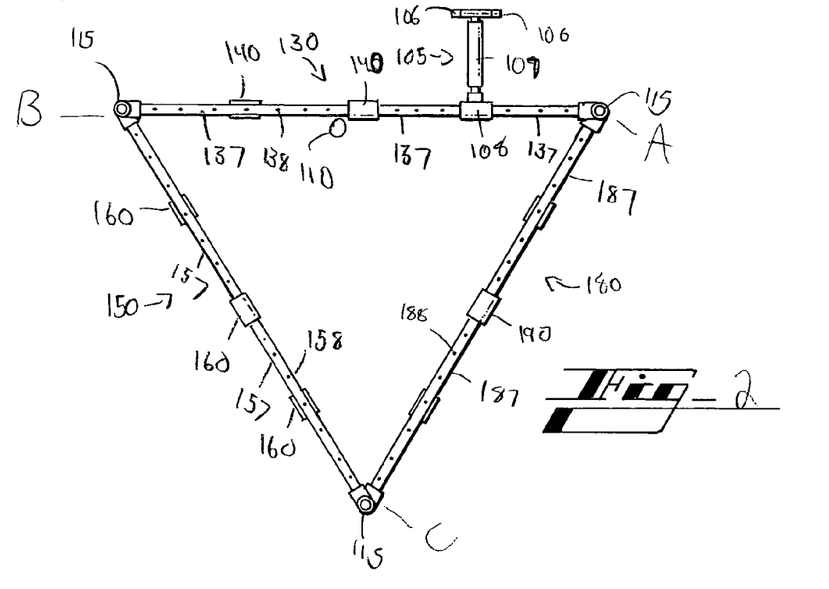
FIG. 2 illustrates a bottom view of an embodiment of a gardening cage.

FIG. 2 illustrates a bottom view of an embodiment of a gardening cage 100. As described above, the cage 100 includes three panels 130, 150, 180 that are arranged in a triangular orientation. The triangular orientation of the panels 130, 150, 180 offers several advantages. The panels 130, 150, 180 include a plurality of horizontal rungs 135, 155, 185 and connectors 140, 160, 190 that connect the horizontal rungs 135, 155, 185 to one another.

The panels 130, 150, 180 further include elbows 165 that interconnect the horizontal rungs 135, 155, 185 with vertical rungs (see below). The cage 100 further includes a water inlet 105 that can include one or more barbed fittings 106 to receive a water source such as a hose and to connect to inlets on adjacent cages, if connected. The inlet 105 can include an extension 107, if necessary, and a coupling 108 to the cage 100. The cage 100 can further include a fertilizer coupling 110.

As described above, all rungs of all panels 130, 150, 180 are coupled together creating a continuous water channel throughout the cage. Therefore, any water injected into the inlet 105 fills the entire inner hollow space of the cage 100, provided that the cage 100 has no exit for the water. However, the bottom rungs of each of the panels 130, 150, 180 are irrigating rungs 137, 157, 187, each having irrigating orifices 138, 158, 188. The irrigating orifices 138, 158, 188 allow water that has been injected into the cage 100 to be released from the irrigating rungs 137, 157, 187. It is appreciated that the orifices 138, 158, 188 can be simple holes or more complicated nozzles and drippers. Therefore, as water and fertilizer is mixed within the panels 130, 150, 180, the resulting mixture is gradually released from the orifices 138, 158, 188 for controlled gradual watering and fertilizing of the plants within the cage 100. It is further appreciated that with a predictable rate of release, water flow into the cage can be controlled and adjusted as needed. For example, the rate of the water into the cage can be slightly greater than the release rate in order to store water within the cage for release. With a set amount of water stored within the cage, the rate of water into the cage can then be matched with the release rate so that a set amount of water remains within the cage 100. It is appreciated that several injection and release rates are possible.

FIG. 2 further illustrates a bottom view of cage stakes 115. The cage stakes 115 are used to insert the cage into the soil of the garden, or alternatively as stands if the cage 100 is used on a solid surface such as a deck or patio. In a typical embodiment, the stakes have sharp ends so that they can be easily inserted into the ground. Furthermore, the stakes 115 are typically hollow tubes but are typically also isolated from the continuous water matrix as described above. In this way, too large a flow of water from the bottoms of the stakes 115 into the ground is prevented. In another embodiment, if deeper irrigation is desired, the hollow stakes 115 can be coupled to the water matrix so that additional water flows from the tips of the stakes 115 directly into the ground.

Figure 3:
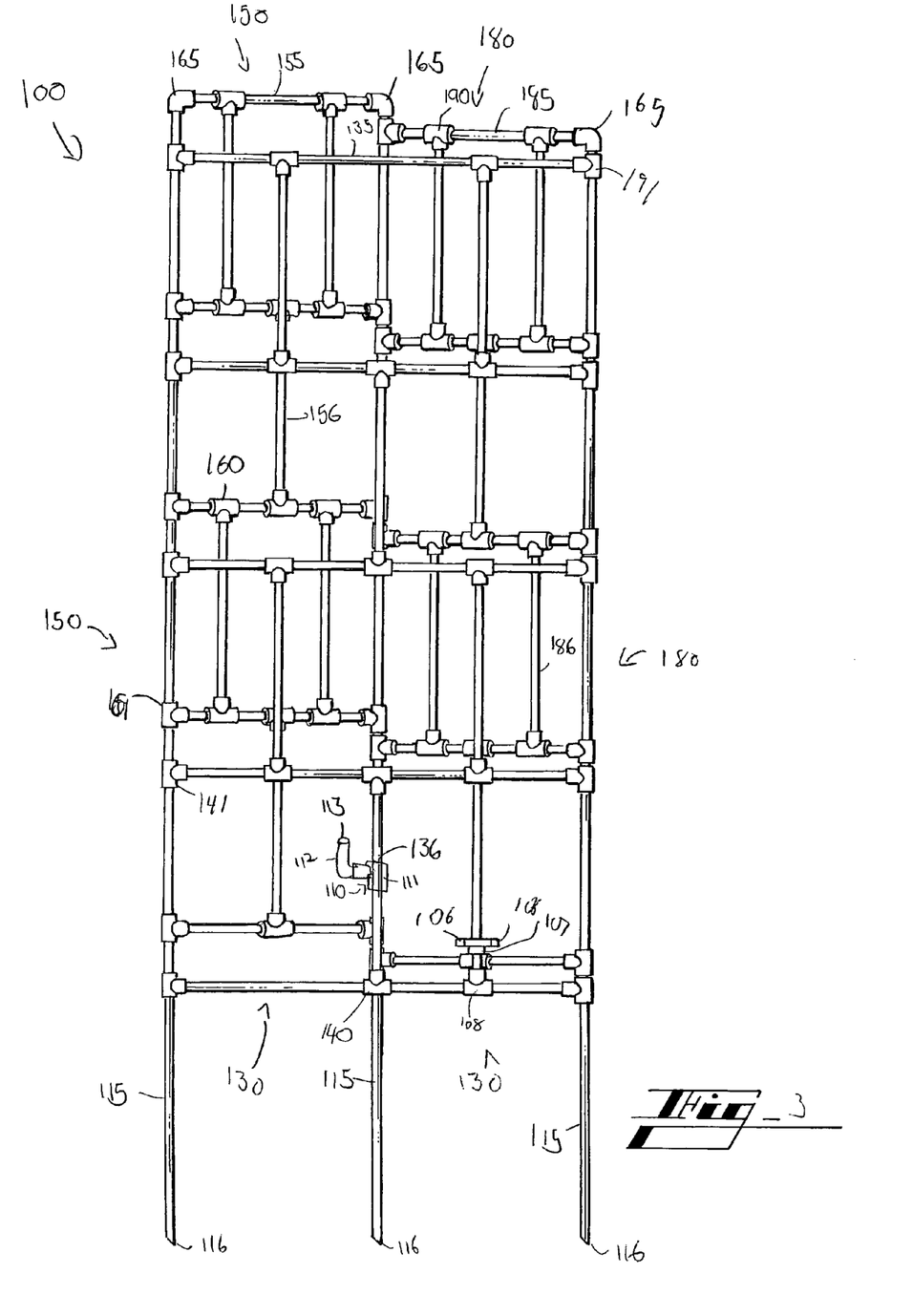
FIG. 3 illustrates a front view of an embodiment of a gardening cage.

FIG. 3 illustrates a front view of an embodiment of a gardening cage 100. As described above, the cage 100 includes three geometrically arranged panels 130, 150, 180. The panels 130, 150, 180 include a plurality of horizontal rungs 135, 155, 185 and connectors 140, 160, 190 that connect the horizontal rungs 135, 155, 185 to one another. The panels 130, 150, 180 further include elbows 165 that interconnect the horizontal rungs 135, 155, 185 with the vertical rungs 136, 156, 186. The panels 130, 150, 180 further include connectors 141, 161,190 that connect the vertical rungs 136, 156, 186 to one another.

In a typical embodiment, the connectors 140, 161, 190 and the connectors 141, 161, 191 are of the same type, which are typically "T" type connectors. Both the connectors 140, 161, 190 and the connectors 141, 161, 191 are discussed in further detail in the description below.

The cascading arrangement of the panels 130, 150, 180 is illustrated in FIG. 3. In the arrangement shown, the panel 130 is the "lowest" of the panels 130, 150, 180. The panel 180 is the "middle" panel and the panel 150 is the "highest" panel. The relative terms of low, middle and high refer to the orientation of the top-most horizontal rungs 135, 155, 185 of each of the panels 130, 150, 180. It us further illustrated that horizontal rungs 135, 155, 185 that are adjacent to each other at the corners A, B, C. are also cascaded with respect to each other. The pattern of this cascading arrangement is repeated throughout the matrix defined in the cage 100, all the way to the bottom-most horizontal rungs 135, 155, 185. IT is further appreciated that the vertical rungs 136, 156, 186 of the panels 130, 150, 180 are also relatively cascaded with respect to vertical rungs 136, 156, 186 of adjacent panels 130, 150, 180. In a typical embodiment, the stakes 115 are arranged generally parallel to one another. It is further illustrated that the bottom most tips 116 of the stakes 115 generally share a common plane of orientation, which can typically be represented a deck or patio floor. In situations in which the cage 100 is used in gardens, the ground is uneven and does not generally define a plane of orientation. In these implementations, the stakes 115 are used to puncture the ground for securement. As such, the tips 116 are formed with points that allow for better insertion into the ground. Due to the cascading arrangement of the panels 130, 150, 180, it is further appreciated that each stake 115 has two common adjacent panels 130, 150, 180 associated with it. In addition, due to the cascading arrangement. If stake 115 has a different length in order to accommodate both the cascading arrangement and ultimately the common planar arrangement of the tips 116 of the stakes 115.

As described above, the cage 100 further includes the water inlet 105 including one or more barbed fittings 106, the extension 107, if necessary, and a coupling 108 to the cage 100. The cage 100 can further include the fertilizer coupling 110, which includes a connector 111 and an elbow 112 having an opening 113, into which fertilizer can be added. In a typical embodiment, the fertilizer coupling 110 is located toward the lower-most portion of the cage 100 and connected to a vertical rung 136 adjacent the water inlet 105, although it can be located at other locations along the cage. By being low and adjacent to the water inlet 105, injected water can better mix the fertilizer upon entrance into the cage matrix.

Figure 4:
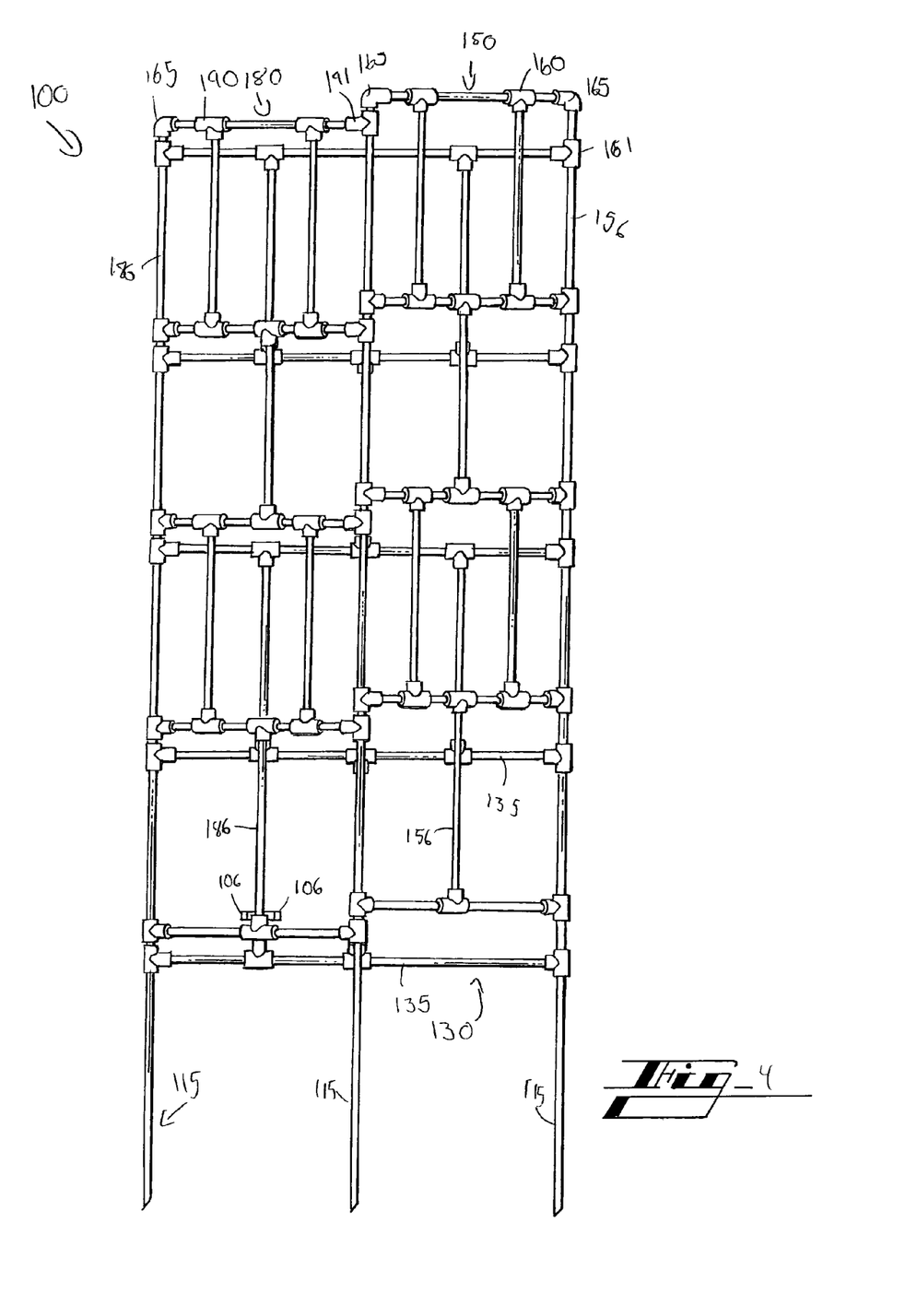
FIG. 4 illustrates a rear view of an embodiment of a gardening cage.
Figure 5:
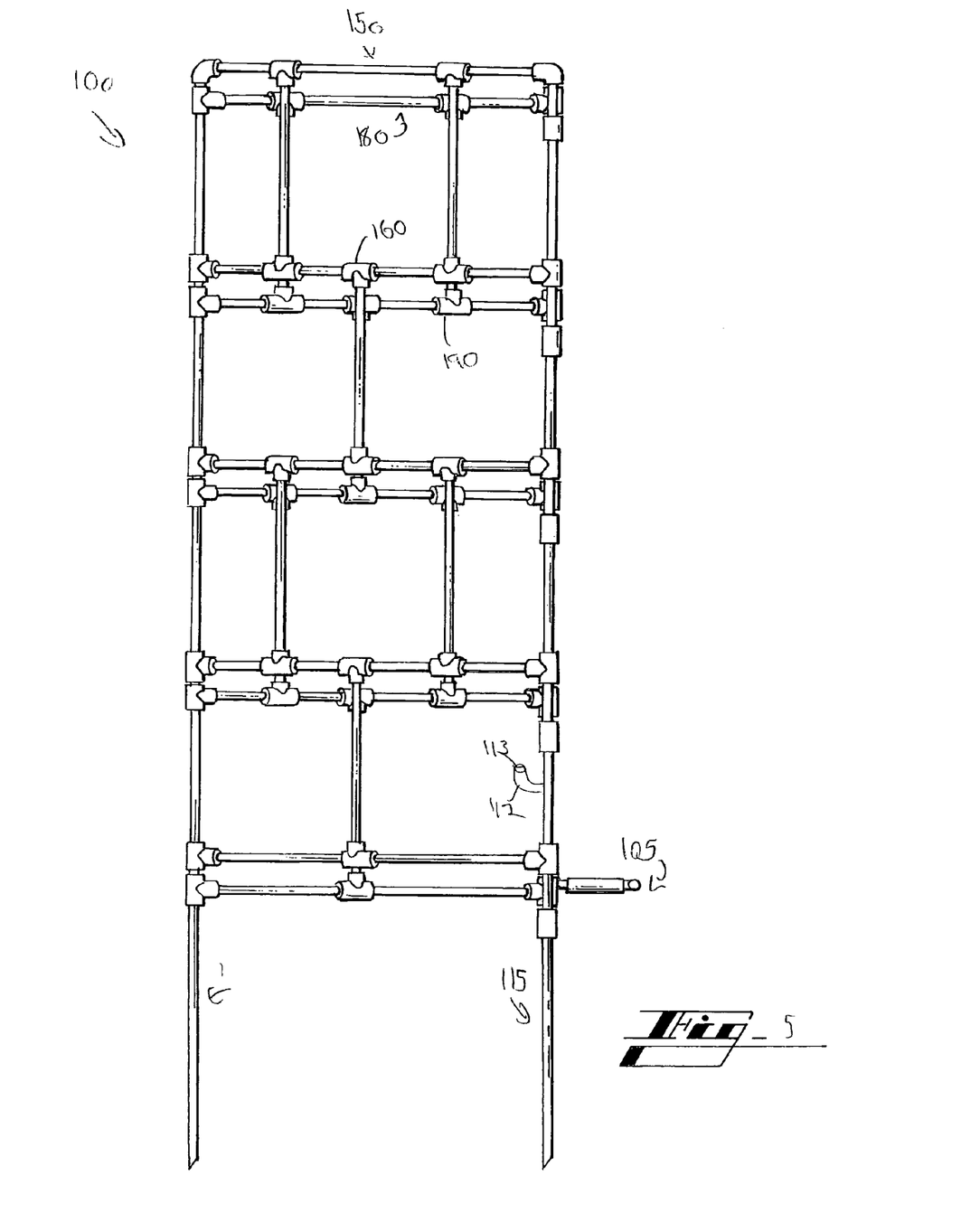
FIG. 5 illustrates a left side view of an embodiment of a gardening cage.
Figure 6:
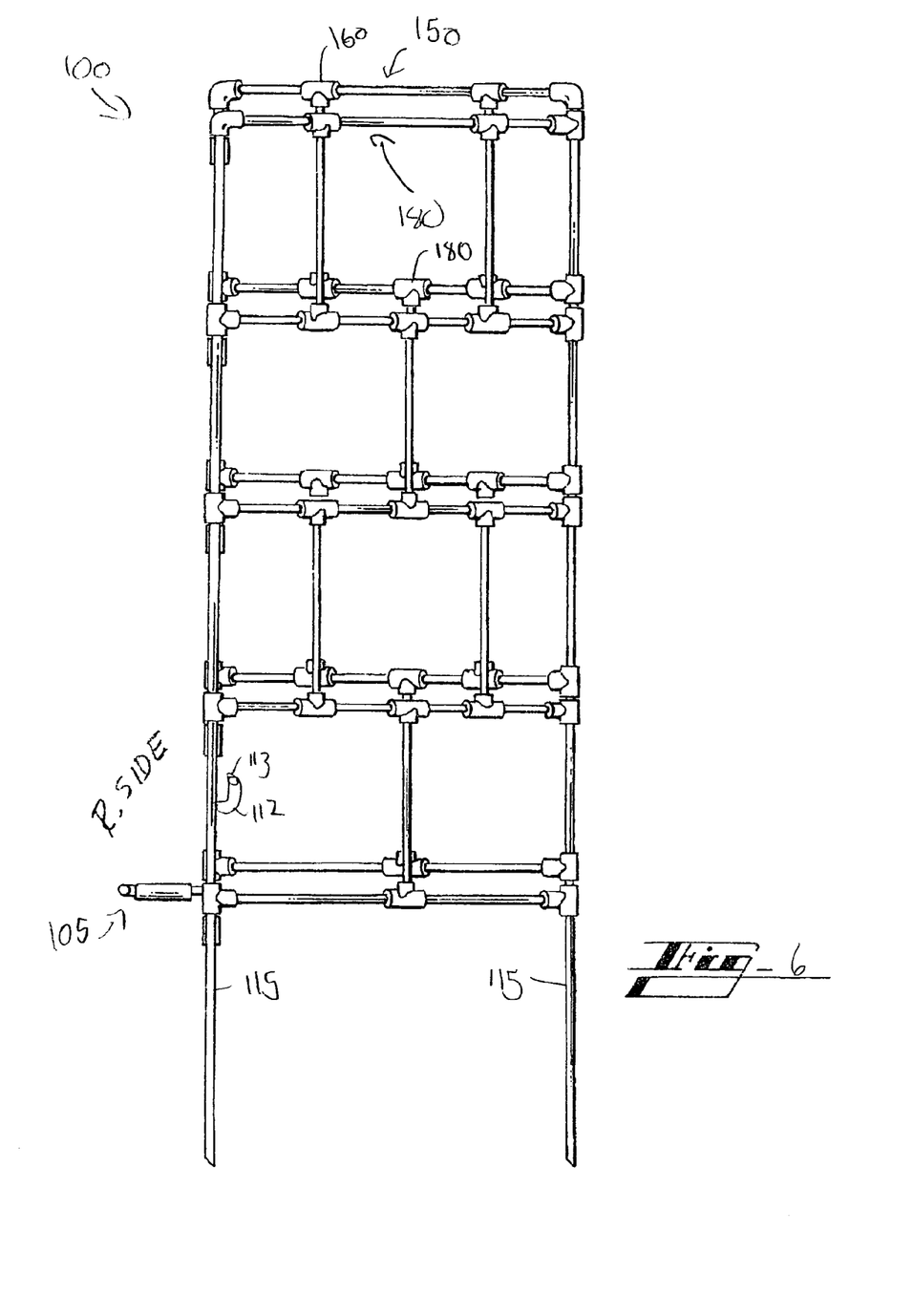
FIG. 6 illustrates a right side view of an embodiment of a gardening cage.

FIG. 4 illustrates a rear view of an embodiment of a gardening cage 100, FIG. 5 illustrates a right side view of an embodiment of a gardening cage 100 and FIG. 6 illustrates a left side view of an embodiment of a gardening cage 100. These different perspectives give a further appreciation of the orientation of the panels 130, 150, 180 in a typical embodiment as discussed in further detail in the description above. Only a few of the horizontal rungs 135, 155, 185, vertical rungs 136, 156, 186, connectors 140, 160, 190 and connectors 141, 161, 191 have been labeled as representatives of each given panel 130, 150, 180.

Figure 7:
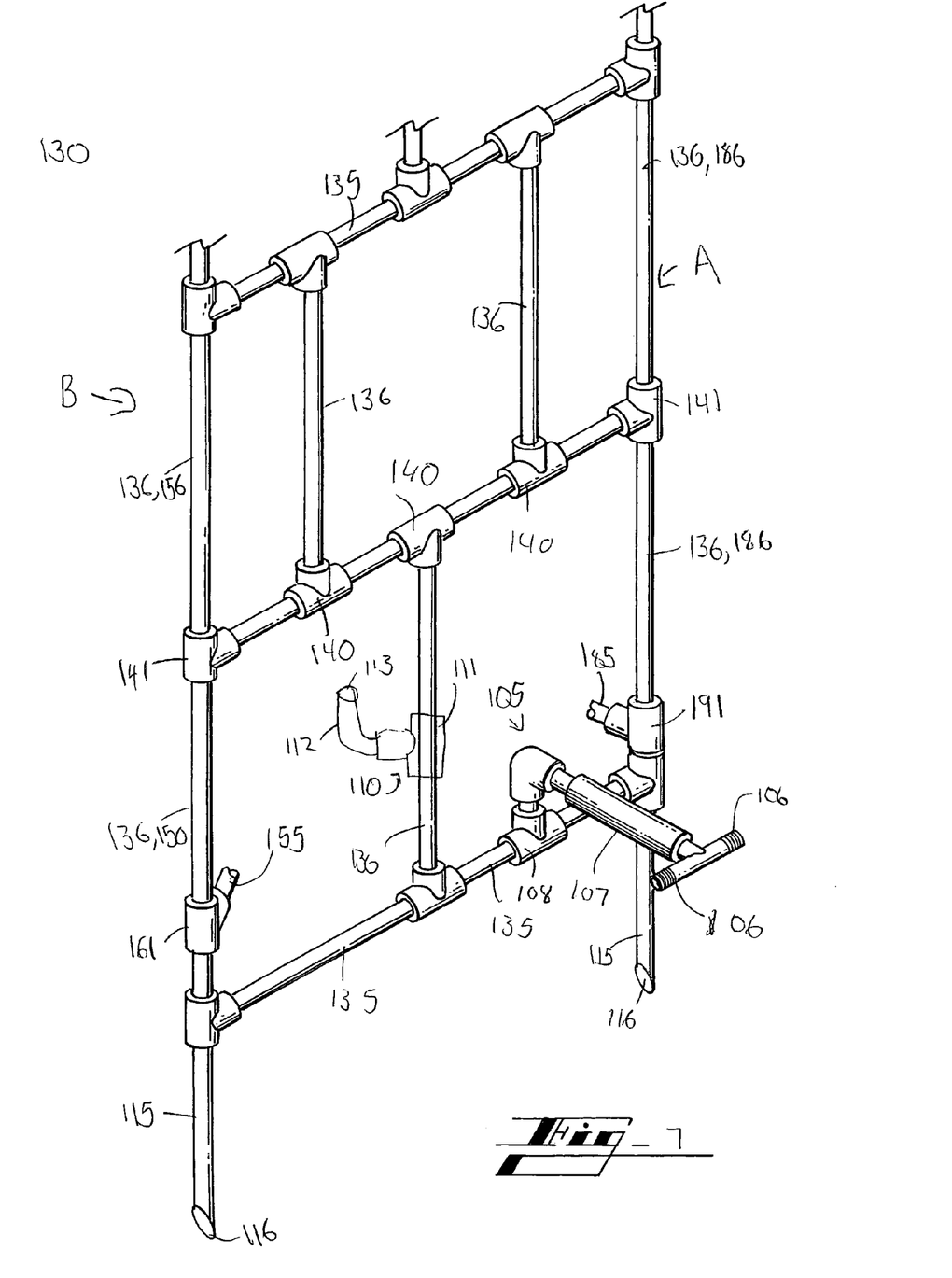
FIG. 7 illustrates a close up view of an embodiment of a panel of a gardening cage.

FIG. 7 illustrates a close up view of an embodiment of the panel 130 of a gardening cage 100. This close up view illustrates the horizontal rungs 135 and vertical rungs 136 of panel 130. The connectors 140, 141 connecting horizontal rungs 135 and vertical rungs 136 are further illustrated. The corners A, B as well as a connector 161 and horizontal rung 155 for panel 150 and a connector 191 and horizontal rung 185 for panel 180 are also illustrated. It is thus appreciated that vertical rungs on the corners A, B of the cage are common to adjacent panels 130, 150 and 130, 180. Thus, as illustrated, the corner vertical rungs are labeled vertical rungs 136, 186 and vertical rungs 136, 186. A similar orientation is appreciated for corner C.

As described above, the cage 100 further includes the water inlet 105 including one or more barbed fittings 106, the extension 107, if necessary, and a coupling 108 to the cage 100. The inlet 105 further optionally includes an elbow 109 connected between the coupling 108 and the extension 107. In another embodiment, the extension or the fitting can be directly connected to the coupling 108 without the need for the elbow 109. The cage 100 further includes the fertilizer coupling 110, which includes a connector 111 and an elbow 112 having an opening 113, into which fertilizer can be added.

Figures 8, 9:
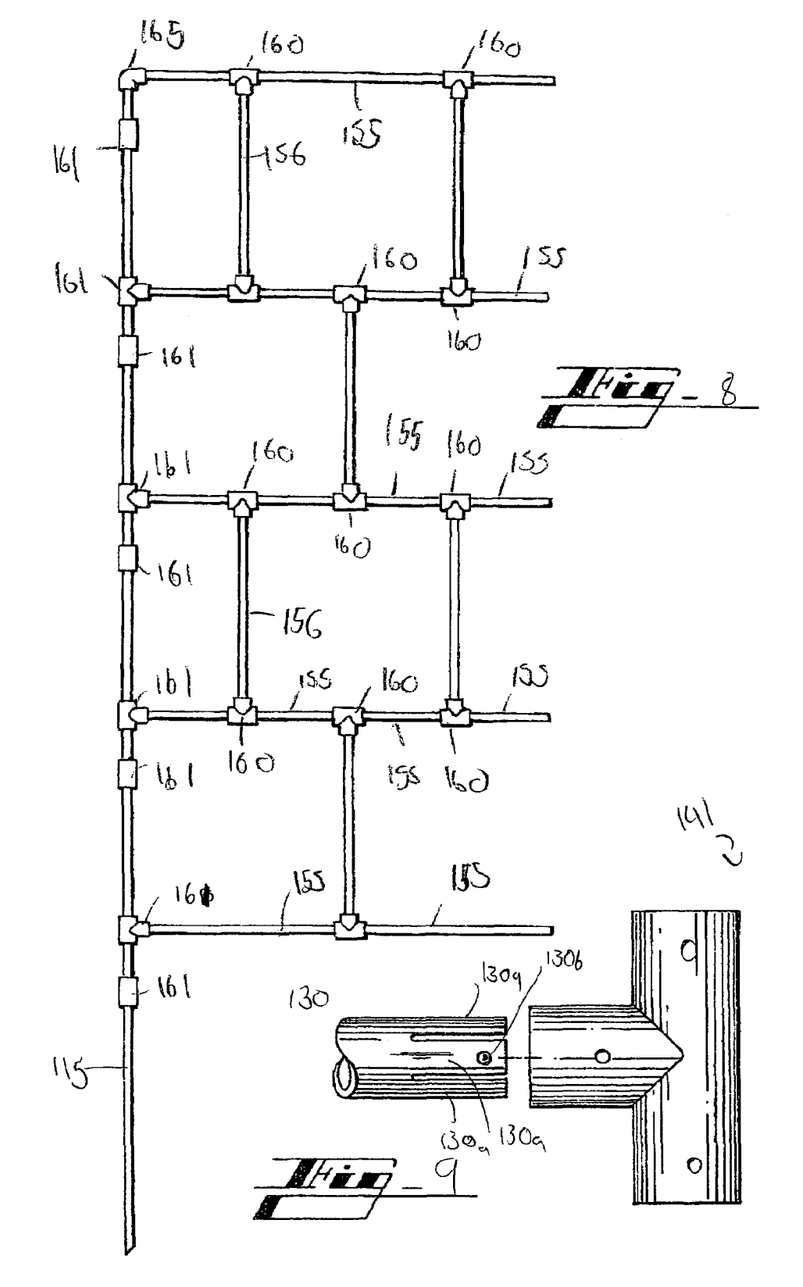
FIG. 8 illustrates a front view of an embodiment of a single panel of an embodiment of a gardening cage.
FIG. 9 illustrates a close up view of an embodiment of a connector and portion of a rung.

FIG. 8 illustrates a front view of an embodiment of a single panel 150 of an embodiment of a gardening cage 100. The isolated panel 150 is shown as representative of one of the panels of the cage 100 in order to illustrate the isolated details of a single panel.

FIG. 9 illustrates a close up view of an embodiment of a connector and portion of a rung. The portion of rung 130 is shown for illustrative purposes. One connector 141 is further shown for illustrative purposes. In a typical embodiment, the end of the rung 130 is split into several deformable flanges 130a. One or more of he flanges can include a button 130b. Correspondingly, the connector 141 has a hole 141a adjacent each of its openings. As such, the flanges 130a can be inserted into one of the openings of the connector 141. During insertion, the button 130b aligns with the hole 141a and snaps into place thereby securing the rung 130 to the connector 141. When the rung 130 is to be removed from the connector, the button 130b can be depressed which clears it of the hole 141a, thereby allowing the rung 130 to be removed from the connector 141. When it is desired to disassemble the cage 100, respective buttons on the various connectors can be depressed that allows the end of the rungs to be removed from respective connectors. It is appreciated that the cage 100 can be easily disassembled and stacked or folded upon itself.

It is appreciated that several modifications can be made including but not limited to the number of panels, rungs and connectors used in the cage.

Several additional cages can be connected to one another thereby allowing several adjacent plants and vines to be grown next to each other.

Additional apparatuses can be added to the cage 100 to create a cage kit and system. A plastic sheath that mimics the overall shape of the cage 100 can be added that fits over the cage 100. The sheath can be zippered to allow the sheath to be easily placed and removed. The sheath can thereby provide protection from frost or other weather and optionally provide a greenhouse setting. Many plants, typically tomatoes grow faster with warm soil. The sheath can help to keep surrounding soil warm. Similarly a netted sheath can be added to the cage 100 to protect plants from borer insects, birds, squirrels and other pests, but allow pollinating insects to enter to reach the buds.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A gardening cage apparatus, comprising:
   three panels in a triangular arrangement and connected by common corners and being in a cascaded arrangement, each of the panels having a plurality of horizontally and vertically arranged hollow rungs;
   a plurality of horizontal T-connectors connecting adjacent horizontal rungs;
   a second plurality of vertical T-connectors connecting vertical rungs, wherein both plurality of connectors further connect vertical rungs and horizontal rungs to one another, thereby coupling the hollow interiors of all rungs creating an internal interconnected matrix;
   stakes connected to bottom horizontal rungs of each of the panels;
   a water inlet connected to one rung of one of the panels, the water inlet being coupled to the internal matrix; and
   a plurality of irrigation orifices located on the bottom horizontal rungs, the orifices being coupled to the matrix,
   wherein the top-most horizontal rung of the first panel is spaced in a cascading fashion by one vertical T-connector above from the top-most horizontal rung of the second panel in a descending fashion, and the top-most horizontal rung of the second panel is spaced in a cascading fashion by one vertical T-connector from the top-most horizontal rung of the third panel in a descending fashion.

2. The apparatus as claimed in claim 1 further comprising a fertilization coupling connected to a rung adjacent the water inlet.

3. The apparatus as claimed in claim 1 wherein the rungs include deformable flanges.

4. The apparatus as claimed in claim 3 further comprising a button connected to one of the flanges.

5. The apparatus as claimed in claim 4 further comprising one or more button holes located on the plurality of connectors.

6. The apparatus as claimed in claim 5 wherein the buttons align with the button holes when the rungs are inserted into the connectors, thereby creating a secure fit.

7. The apparatus as claimed in claim 1 further comprising an elbow on each panel connecting a horizontal rung of one panel to a vertical rung of an adjacent panel.

8. The apparatus as claimed in claim 1 further comprising tips located on one end of the stakes.

9. The apparatus as claimed in claim 8 wherein the tips are oriented in a common plane.

10. A gardening cage kit, comprising:
    a gardening cage having:
      three panels in a triangular arrangement and connected by common corners and being in a cascaded arrangement, each of the panels having a plurality of horizontally and vertically arranged hollow rungs;
      a plurality of horizontal T-connectors connecting adjacent horizontal rungs;
      a second plurality of vertical T-connectors connecting vertical rungs, wherein both plurality of connectors further connect vertical rungs and horizontal rungs to one another, thereby coupling the hollow interiors of all rungs creating an internal interconnected matrix;
    stakes connected to bottom horizontal rungs of each of the panels;
    a water inlet connected to one rung of one of the panels, the water inlet being coupled to the internal matrix; and
    a plurality of irrigation orifices located on the bottom horizontal rungs, the orifices being coupled to the matrix,
    wherein the top-most horizontal rung of the first panel is spaced is spaced one vertical T-connector above from the top-most horizontal rung of the second panel and the top-most horizontal rung of the second panel is spaced one vertical T-connector from the top-most horizontal rung of the third panel, and
    wherein the panels are adapted to be connected and disconnected from each other.

11. The kit as claimed in claim 10 further comprising a hose adapted to be connected to the water inlet.

12. The kit as claimed in claim 10 further comprising a fertilizer coupling adapted to be connected to a rung of the cage.

13. The kit as claimed in claim 10 further comprising a protective sheath adapted to fit over the cage.

14. The kit as claimed in claim 13 wherein the sheath is plastic.

15. The kit as claimed in claim 13 wherein the sheath is netting.

16. A gardening cage system, comprising:
    a gardening cage having:
      three panels in a triangular arrangement and connected by common corners and being in a cascaded arrangement, each of the panels having a plurality of horizontally and vertically arranged hollow rungs;
      a plurality of horizontal T-connectors connecting adjacent horizontal rungs;
      a second plurality of vertical T-connectors connecting vertical rungs, wherein both plurality of connectors further connect vertical rungs and horizontal rungs to one another, thereby coupling the hollow interiors of all rungs creating an internal interconnected matrix;
    stakes connected to bottom horizontal rungs of each of the panels;
    a water inlet connected to one rung of one of the panels, the water inlet being coupled to the internal matrix;
    a hose connected to the water inlet providing water to the internal matrix, thereby creating a contiguous internal water flow within the matrix; and
    a plurality of irrigation orifices located on the bottom horizontal rungs, the orifices being coupled to the matrix, the orifices providing an exit for the water from within the matrix,
    wherein the top-most horizontal rung of the first panel is spaced in a cascading fashion by one vertical T-connector above from the top-most horizontal rung of the second panel in a descending fashion, and the top-most horizontal rung of the second panel is spaced in a cascading fashion by one vertical T-connector from the top-most horizontal rung of the third panel in a descending fashion.

\* \* \* \* \*